United States Patent

[11] 3,581,754

| | | | | |
|---|---|---|---|---|
| [72] | Inventor | Robert B. Adams | | |
| | | Tredyffrin Township, Chester County, Pa. | | |
| [21] | Appl. No. | 650,839 | | |
| [22] | Filed | July 3, 1967 | | |
| [45] | Patented | June 1, 1971 | | |
| [73] | Assignee | Moore Products Co. | | |
| | | Spring House, Pa. | | |
| | | Continuation-in-part of application Ser. No. 468,488, June 30, 1965, now abandoned. | | |

[54] LIQUID LEVEL CONTROL APPARATUS USING FLUIDIC SENSOR
12 Claims, 4 Drawing Figs.

[52] U.S. Cl. ........................................... 137/81.5, 137/393
[51] Int. Cl. ........................................... F15c 1/10
[50] Field of Search ................................. 137/81.5, 393

[56] References Cited
UNITED STATES PATENTS

| | | | |
|---|---|---|---|
| 3,137,464 | 6/1964 | Horton ........................ | 137/81.5X |
| 3,144,309 | 8/1964 | Sparrow ...................... | 137/81.5X |
| 3,267,949 | 8/1966 | Adams ......................... | 137/81.5 |
| 3,277,914 | 10/1966 | Manion ........................ | 137/81.5 |
| 3,379,203 | 4/1968 | Manion ........................ | 137/81.5 |

Primary Examiner—William R. Cline
Attorney—Zachary T. Wobensmith, 2nd

ABSTRACT: Liquid level control apparatus in which the liquid is supplied through a fluid supply line without any bypassing of the supplied liquid, a fluid interaction chamber being employed with a pressure takeoff probe being provided in the chamber for controlling the supplying of the liquid and a control fluid connection for sensing the level and controlling the relation of the liquid to the probe.

PATENTED JUN 1 1971 3,581,754

INVENTOR.
ROBERT B. ADAMS
BY
ATTORNEY

LIQUID LEVEL CONTROL APPARATUS USING FLUIDIC SENSOR

CROSS-REFERENCE

This application is a continuation in part of my prior application filed June 30, 1965, Ser. No. 468,488 now abandoned.

BACKGROUND OF THE INVENTION

1. Field of the Invention

This invention relates to liquid level control apparatus and more particularly to such apparatus in which the presence or absence of liquid at a control port at a predetermined level is effective to control the liquid supply to the tank.

2. Description of the Prior Art

In my prior application for U.S. Pat. filed Mar. 2, 1964, Ser. No. 348,514, now U.S. Pat. No. 3,267,949, there is shown apparatus in which a continuous flow of fluid is utilized for maintaining a predetermined level in a tank. Such a system required disposal or return of fluid in a tank. Such a system required disposal or return of fluid which is not required to maintain the desired level. Such a system is not particularly suited for successive filling of tanks or containers to a selected level.

Manion, in U.S. Pat. No. 3,277,914 shows an automatic fill valve with a bypass or return connection and does not have a single delivery outlet. Manion also lacks any pressure takeoff probe for flow control.

Allen et al., in U.S. Pat. No. 3,072,147, show a pressure operated control switch but do not have any single delivery passageway nor any comparable pressure probe location.

It is the principal object of the present invention to provide a liquid level control apparatus in which the delivery of fluid to a tank or other receptacle is controlled in a simple but effective manner.

It is a further object of the present invention to provide liquid level control apparatus for controlling the filling of a tank or other vessel in which a motor control switch is provided responsive to a selected liquid level, and which controls fluid delivery to the vessel, as determined by the liquid level.

It is a further object of the present invention to provide liquid level control apparatus for a tank or other vessel having as an important component a pressure responsive element which is controlled by fluid flow and by the liquid level.

It is a further object of the present invention to provide control apparatus employing a nozzle, and a control port therefor in which the size of the control port is not critical.

It is a further object of the present invention to provide control apparatus employing a nozzle and in which a control port therefor is located to prevent jet deflection by momentum exchange with the control fluid.

It is a further object of the present invention to provide control apparatus employing a pressure responsive element in which a fluid interaction chamber is employed, the chamber having a sensing member therein for pressure responsive to flow through the chamber and a control connection for controlling conditions in the fluid interaction chamber.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENTS

Figure 1:
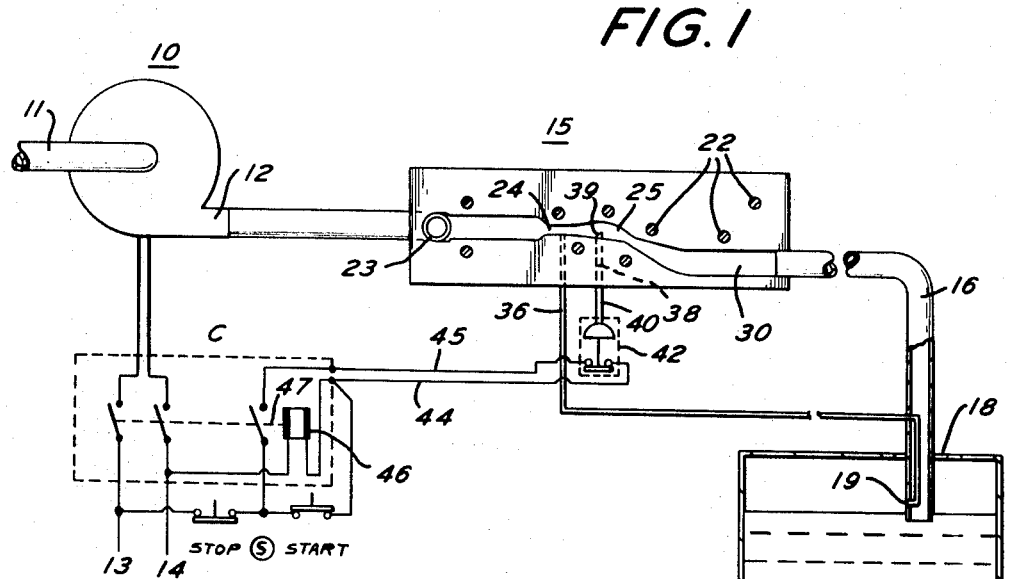
FIG. 1 is a diagrammatic view of liquid level control apparatus in accordance with the invention.

Referring now more particularly to FIG. 1 of the drawings, in the embodiment of the invention therein illustrated and in which parts are shown diagrammatically, an electric motor driven pump 10 is provided having a fluid supply connection 11 and a fluid delivery connection 12. Power leads 13 and 14 are provided and are connected through a motor control unit C of conventional type to the winding of the motor of the motor driven pump 10.

The fluid connection 12 is connected to a pressure responsive element or level switch 15 from which a supply pipe 16 extends to a tank or other vessel 17 to be filled having an inlet opening 18 for the delivery of fluid thereinto.

The supply pipe 16 has a predetermined location such as at 19 to which the liquid is to be supplied.

The pressure responsive element or level switch 15 has a body portion 20 formed as a plate with a cover plate 21 secured together by screws 22. The body portion 20 has a fluid connection 23 to which the pipe 16 is connected. The fluid connection 23 has in series therewith a nozzle 24 for supplying a fluid jet into an interaction chamber 25.

Figure 2:
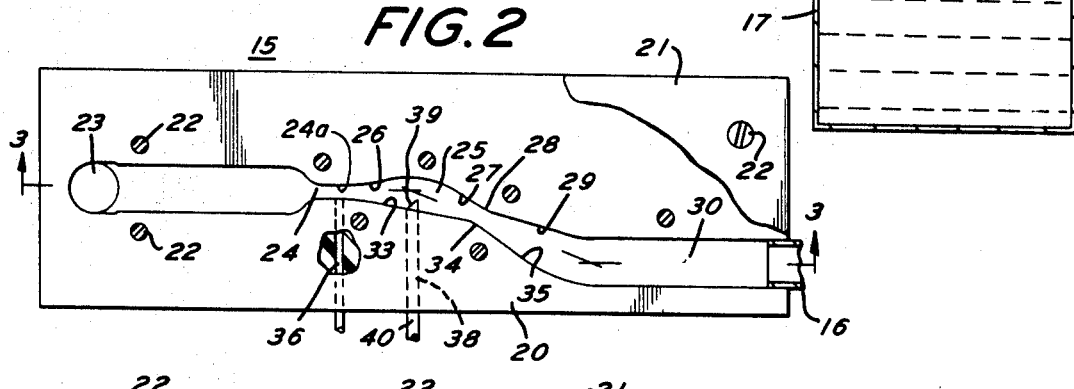
FIG. 2 is an enlarged view in elevation of one preferred form of pressure responsive element and its interaction chamber, parts being broken away to show the details of construction.
Figure 3:
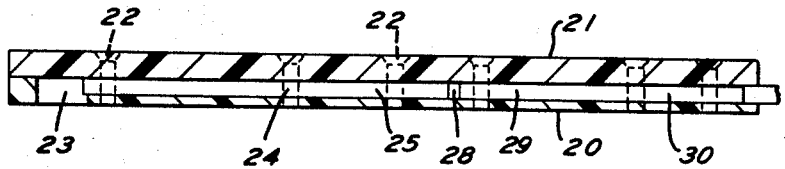
FIG. 3 is a longitudinal sectional view taken approximately on the line 3-3 of FIG. 2.

In the form of switch 15 shown in FIGS. 2 and 3, which is particularly suited for high viscosity fluids, the chamber 25, on one side of the central longitudinal axis of the path of the jet as it emerges from the nozzle 24, has a diverging wall 26 from which a converging wall 27 extends with a continuous curvature to a straight throat wall 28. From the throat wall 28 a diverging wall 29 extends to a passageway 30 to which the pipe 16 is connected.

The chamber 25, on the other side of the central axis of the path of the jet as it emerges from the nozzle 24 has a diverging straight wall 33 which extends to a throat wall 34 parallel to the throat wall 28 and from which a diverging wall 35 extends to the passageway 30.

A fluid connection 36 which extends to the level determining location 19 in the supply pipe 16 is provided for controlling the direction of flow of the jet from the nozzle 24 in the chamber 25 and may be beyond the nozzle 24 as heretofore in fluid amplifiers but is connected to the nozzle 24 in such manner that opposite the fluid connection 36 the nozzle wall extends downstream to a sufficient extent that jet deflection by momentum exchange with the control fluid entering through the fluid connection 36 is prevented. Or stated another way the nozzle wall opposite the fluid connection 36 extends downstream without any offsets or appreciable deviations in shape to that extent. Accordingly, the connection 36 can be upstream of the discharge end of the nozzle 24, i.e., intermediate the inlet and outlet ends of the nozzle 24. This latter location of the terminus of the fluid connection 36 renders the size thereof noncritical. Since the jet is confined in the nozzle 24 by nozzle wall 24a opposite the fluid connection 36 it is not deflected by momentum exchange by fluid entering through the fluid connection 36 as it could be where the jet is not so confined.

The wall 33 also has extending therethrough a tubular pressure pickup probe 38 with a beveled end 39 and which extends just short of the central longitudinal axis of the path of the jet from the nozzle 24. The pressure pickup probe 38 is connected by a fluid connection 40 to a pressure operated electric switch 42. The switch 42 can be of any well-known type, and can have a spring positioned diaphragm against which the pressure is effective with a suitable linkage operated by the diaphragm movement for contact control.

The motor control unit C has conductors 44 and 45 extending to the contacts of the switch 42 and has a solenoid 46 for actuating an armature 47 to connect the leads 13 and 14 for motor pump actuation, and subject to the contacts of the switch 42 remaining closed until opened by pressure applied to the switch 42. The control unit C also has associated therewith start and stop switches S.

Figure 4:
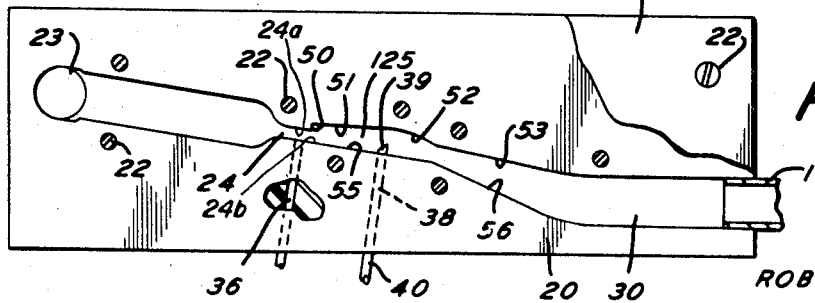
FIG. 4 is a view similar to FIG. 2 showing another form of pressure responsive element and its interaction chamber, parts being broken away to show the details of construction.

In the form of switches 115 shown in FIG. 4, which is particularly suited for low and medium viscosity fluids, the nozzle 24 has therebeyond on one side of the central longitudinal axis of the path of the jet from the nozzle 24, a shoulder or set back 50 from which as a boundary of an interaction chamber 125 a diverging wall 51 extends to a converging wall 52 with continuous curvature. The converging wall 52 extends to a diverging wall 53 which extends to a passageway 30, as before.

On the other side of the central longitudinal axis of the jet from the nozzle 24 a wall 55 is provided, as a continuation of the contiguous nozzle wall 24b. The wall 55 extends to a diverging wall 56 which extends to the passageway 30.

The nozzle 24 has therein opposite the wall 24a of the nozzle, a jet position controlling fluid connection 36, as before. The nozzle walls 24a and 24b extend downstream of the fluid connection 36.

The wall 55 has extending therethrough a tubular pressure pickup probe 38 which is disposed so as to be in intersecting relation to the longitudinal axis of the path of the jet from the nozzle 24.

The mode of operation will now be pointed out.

Referring first to FIGS. 1, 2 and 3, in order to start the delivery of fluid into a tank 17 into which the pipe 16 has been inserted, the starting switch S is operating to start up the motor driven pump 10. Fluid from the pump 10 is delivered through the delivery connection 12 and to the pressure responsive element or level switch 15.

A jet of fluid is formed by the nozzle 24 and is directed into the interaction chamber 25. The direction of this jet is determined by pressure conditions prevailing at the fluid connection 36.

At the start of filling of a tank 17 the fluid connection 36 is exposed or open to the atmosphere by reason of the liquid level in the tank 17 being below the level location 19. Air will be induced through the fluid connection 36 and the jet will be diverted so as to flow along the walls 26, 25, 28 and 29 to the passageway 30 and through the pipe 16 to supply fluid to the tank 17. While this character of flow is taking place, the fluid stream misses the probe 38 so that no pressure is applied through the fluid connection 40 and at the pressure switch 42. The circuit which includes the conductors 44 and 45 and the pressure operated switch 42 is effective for operation of the motor driven pump 10 until the liquid in the tank 17 rises to the level at 19 and shuts off flow of atmospheric air at this location into the fluid connection 36 to the outlet of the nozzle 24. With such flow cut off the jet from the nozzle 24 will flow along the wall 33, impinge on and apply pressure through the probe 38. This pressure applied through the fluid connection 40 to the pressure operated switch 42 will break the circuit to the control unit C shutting off the current supply to the motor driven pump 10 and cut off further supply of fluid to the tank 17 which can then be removed and replaced by another tank 17 to be filled.

Initiation of filling can be effected as before by operation of the starting switch S.

In FIGS. 2 and 3 the probe 38 is shown at a location which is out of the path of flow from the nozzle 24 at starting so that pressure is not supplied to the probe 38 until shutoff is desired.

In FIG. 4 the probe 38 is shown as located in the path of fluid at startup so that a pressure signal would be applied as a first kick at the pressure operated switch 42. To overcome the effect of such a signal the starting switch S must be held in active position until the flow through chamber 25 has stabilized.

I claim:

1. Liquid level control apparatus for a vessel comprising:
a source of liquid,
a fluid delivery connection connected to said source for delivery of liquid to a vessel, and
control means for controlling the delivery of liquid from said source to said delivery connection,
said control means including a fluid interaction chamber interposed in said fluid delivery connection,
said fluid interaction chamber having a nozzle member at one end thereof interposed in said fluid delivery connection for directing into said chamber a fluid jet,
said fluid interaction chamber having a single outlet and being bounded by opposite sidewalls for guiding fluid flow in two different paths between said nozzle and said outlet,
said outlet being connected to said fluid delivery connection and discharging to said fluid delivery connection all the fluid in each of said paths,
said fluid interaction chamber having a control fluid connection controlled by the liquid level in the vessel for determining the positioning of the jet, and
a pressure takeoff probe member extending into said fluid interaction chamber for takeoff of a control pressure for said liquid delivery control.

2. Liquid level control apparatus as defined in claim 1 in which
said sidewalls are disposed with respect to the axis of the nozzle so that one of said sidewalls is out of alignment with said axis to a greater extent than the other of said sidewalls, and
said control fluid connection is provided along the side having the lesser extent of out of alignment and contiguous to said nozzle.

3. Liquid level control apparatus as defined in claim 2 in which
said probe member extends through said sidewall having the lesser extent of out of alignment and downstream of said control fluid connection.

4. Liquid level control apparatus as defined in claim 2 in which
said probe member is disposed in said chamber at a location to sense the dynamic pressure along the same sidewall having the lesser extent of out of alignment.

5. Liquid level control apparatus as defined in claim 1 in which
said probe member is out of alignment with the jet delivered from the nozzle in one controlled position of said jet and is in alignment with the jet delivered from the nozzle in the other controlled position of said jet.

6. Liquid level control apparatus as defined in claim 1 which additionally includes
means responsive to the pressure in said probe for controlling the delivery of liquid from said source.

7. Liquid level control apparatus as defined in claim 1 in which
said control fluid connection and said fluid delivery connection have contiguous terminal portions in fixed relation to each other.

8. In combination,
a source of liquid,
means for controlling the delivery of liquid from said source,
said means including a fluid interaction chamber connected to said source,
said interaction chamber having enclosing walls including opposite sidewalls for guiding liquid flow in two different paths to a single outlet,
said interaction chamber having a nozzle at one end thereof for directing a liquid jet into said chamber, and
a control fluid connection connected with respect to one side of said nozzle for controlling the positioning of said jet selectively with respect to said sidewalls,
said nozzle having its minimum cross section extending downstream from said control fluid connection and having a continuous wall portion on the opposite side thereof from said control fluid connection and downstream with respect thereto for confining the liquid jet along said opposite side.

9. The combination defined in claim 8 in which said opposite sidewalls are disposed with respect to the axis of said nozzle so that one of said sidewalls is out of alignment with said axis to a greater extent than the other of said sidewalls, and said control fluid connection is along the side having the lesser extent of out of alignment.

10. The combination defined in claim 8 in which said opposite sidewalls are disposed with respect to the axis of the nozzle so that one of said sidewalls is out of alignment with said axis to a greater extent than the other of said sidewalls, said control fluid connection extends to said nozzle on the side thereof corresponding to the sidewall of lesser extent of out of alignment for the movement of the jet in one direction and along said other sidewall when liquid is admitted through said control fluid connection and along said one sidewall when gas is admitted through said control fluid connection.

11. Means to control the liquid level in a container comprising:

a. a fluid amplifier having a main inlet, a control inlet and an outlet, b. said main inlet communicating with a source of liquid under pressure, c. said outlet communicating with the container in fluid dispensing relation thereto, d. said control inlet communicating with the container at substantially the level at which the liquid is to be controlled.

12. Means to control the liquid level in a container comprising:

a. a fluid amplifier having a main inlet, a control inlet and an outlet, b. said main inlet communicating with a source of liquid under pressure, c. said outlet communicating with the container in fluid dispensing relation thereto, d. said control inlet communicating with the container at substantially the level at which the liquid is to be controlled, e. said main inlet, said control inlet and said outlet being arranged so that liquid entering said main inlet will exit through said outlet as long as said control inlet is unrestricted.

Disclaimer 3,581,754.—*Robert B. Adams*, Tredyffrin Township, Chester County, Pa. LIQUID LEVEL CONTROL APPARATUS USING FLUIDIC SENSOR. Patent dated June 1, 1971. Disclaimer filed Feb. 1, 1971, by the assignee, *Moore Products Co.*

Hereby disclaims the portion of the term of the patent subsequent to Aug. 23, 1983.

[*Official Gazette November 16, 1971.*]